(12) United States Patent
Jain et al.

(10) Patent No.: US 12,417,347 B2
(45) Date of Patent: Sep. 16, 2025

(54) SAMPLE CLASSIFICATION USING NATURAL LANGUAGE PROCESSING MODELS

(71) Applicant: McAfee, LLC, San Jose, CA (US)

(72) Inventors: Shubham Jain, Beawar (IN); Sidharth Pipriya, Bengaluru (IN); Pratim Kumar Mukherjee, Bangalore (IN); Anuj Khurana, Chandigarh (IN)

(73) Assignee: McAfee, LLC, San Jose, CA (US)

( * ) Notice: Subject to any disclaimer, the term of this patent is extended or adjusted under 35 U.S.C. 154(b) by 109 days.

(21) Appl. No.: 18/526,832

(22) Filed: Dec. 1, 2023

(65) Prior Publication Data

US 2025/0181832 A1 Jun. 5, 2025

(51) Int. Cl.
*G06F 40/284* (2020.01)
*G06F 21/53* (2013.01)
*G06F 21/56* (2013.01)
*G06F 40/205* (2020.01)

(52) U.S. Cl.
CPC ............ *G06F 40/284* (2020.01); *G06F 21/53* (2013.01); *G06F 21/56* (2013.01); *G06F 40/205* (2020.01); *G06F 2221/034* (2013.01)

(58) Field of Classification Search
CPC ...... G06F 40/284; G06F 40/205; G06F 21/53; G06F 21/56; G06F 2221/034
USPC .......................................................... 726/23
See application file for complete search history.

(56) References Cited

U.S. PATENT DOCUMENTS

| 10,956,477 | B1* | 3/2021 | Fang ..................... G06F 40/30 |
| 2022/0164447 | A1* | 5/2022 | Yi ......................... G06F 21/566 |
| 2023/0214533 | A1* | 7/2023 | Hecht .................... G06F 21/52 726/1 |
| 2024/0031403 | A1* | 1/2024 | Pospelova ........... H04L 63/1416 |
| 2024/0362330 | A1* | 10/2024 | Vigna .................. G06N 3/0464 |
| 2025/0045393 | A1* | 2/2025 | Rokka Chhetri ..... G06F 21/566 |

OTHER PUBLICATIONS

Tran et al., NLP-based Approaches for Malware Classification from API Sequences, IEEE, 2017 21st Asia Pacific Symposium on Intelligent and Evolutionary System, pp. 101-105 (Year: 2017).*

* cited by examiner

*Primary Examiner* — Thanh T Le
(74) *Attorney, Agent, or Firm* — Hanley, Flight & Zimmerman, LLC

(57) ABSTRACT

Sample classification using natural language processing (NLP) models is disclosed herein. An example apparatus comprises interface circuitry, machine readable instructions, and programmable circuitry to at least one of instantiate or execute the machine readable instructions to access a set of instructions, the set of instructions representing executable instructions, determine an Application Programming Interface (API) call sequence based on the set of instructions, transmit the API call sequence to a NLP model, the NLP model to generate a set of tokens, the set of tokens representing the API call sequence, the set of tokens readable in the NLP model, and classify the API call sequence as clean or malicious based on the tokens, and classify the set of instructions as clean or malicious based on the classification of the API call sequence and at least one other feature of the set of instructions.

22 Claims, 11 Drawing Sheets

| HASH | PROBABILITY | ST DIRTY PERCENT | ST CLEAN PERCENT | WK CLEAN PERCENT | WK DIRTY PERCENT | UNKNOWN PERCENT | FINGERPRINTS | AVG TOTAL COUNT | MEDIAN TOTAL COUNT | LABEL |
|---|---|---|---|---|---|---|---|---|---|---|
| 000012FB4674DFFCCF9D5E46EE3B59DD | 0.010005 | 31.06 | 0.00 | 61.36 | 0.25 | 7.32 | 4 | 1110 | 34 | 0 |
| 00006ACAADC4FB7ECFA4C2AE34CF94EA | 0.991572 | 95.04 | 0.09 | 0.46 | 2.21 | 2.21 | 11 | 527956 | 434 | 1 |
| 0000ED59272ED01DA36069E4D5B26BC5 | 0.079942 | 21.38 | 3.55 | 21.79 | 6.76 | 46.52 | 15 | 736983 | 44210 | 0 |

FIG. 3

SAMPLE CLASSIFICATION USING NATURAL LANGUAGE PROCESSING MODELS

FIELD OF THE DISCLOSURE

This disclosure relates generally to sample classification and, more particularly, to sample classification using natural language processing models.

BACKGROUND

Malware is malicious software designed to harm or exploit a programmable device or network. Malware can steal private information, hijack devices, and cause significant disruptions to computer systems. Machine learning can be applied to malware detection. In machine learning, programmers use a trained machine learning model that generates predictions and trains itself to improve prediction accuracy.

BRIEF DESCRIPTION OF THE DRAWINGS

FIG. 3 illustrates example output data associated with the sequence diagram of FIG. 2.

In general, the same reference numbers will be used throughout the drawing(s) and accompanying written description to refer to the same or like parts. The figures are not necessarily to scale.

DETAILED DESCRIPTION

In computing and/or electronic environments, malicious actors aim to conceal their attacks on computing and/or electronic devices, computing and/or electronic systems, etc., by leveraging legitimate or trusted software applications. A common attack strategy can be embedding and/or integrating computer files with malicious executable files that, when executed and/or instantiated, can compromise a computing and/or electronic device. For example, the malicious executable files can be a portable executable (PE) file that, when executed and/or instantiated, can compromise a computing and/or electronic device. PE is a file format used for executables (e.g., executable files with an ".exe" file name extension), object code, etc. The PE file format is a data structure that encapsulates executable code with the information necessary for an OS (e.g., Microsoft Windows OS) to manage the encapsulated or wrapped executable code. In addition, such malicious executable files may initiate/trigger an Application Programming Interface (API) call sequence. An example API call sequence is a set of routines that an application program calls to request and carry out services performed by the operating system (OS). Therefore, APIs are the interface between the application program and the OS. In some examples, API calls operate in sensitive computing operations such as communications, file handling, memory management, networks, etc. Additionally, an example API call sequence may be initiated by an executable file that triggers the sequence of processes or tasks to complete execution of the API call.

A user may download or otherwise access a compromised computer file onto an endpoint device. The compromised file may include an executable that is malware. Malware may include any program or file that is intentionally harmful to a computer, such as computer virus programs, spyware, and other standalone malware computer programs. The user may initiate the executable to proceed with an API call, but has inadvertently executed and/or instantiated malware that has been disguised as a legitimate executable file. After the malware is executed and/or instantiated, the endpoint device may become compromised.

Examples disclosed herein protect endpoint devices from such malware attacks. Examples disclosed herein can analyze, scan, etc., an executable to determine whether the executable is trustworthy or contains malware. In particular, examples disclosed herein provide a safe framework (e.g., a sandbox) to execute executable files and monitor the execution of the subsequent API call sequence. Additionally, examples disclosed herein may access machine learning (ML) models to provide probabilistic classification of samples (e.g., unknown executables, unclassified executables, etc.). Further, examples disclosed herein utilize natural language processing (NLP) to symbolize and/or characterize executable files as sets of tokens which, in turn, can be employed as inputs to a ML model.

Figure 1:
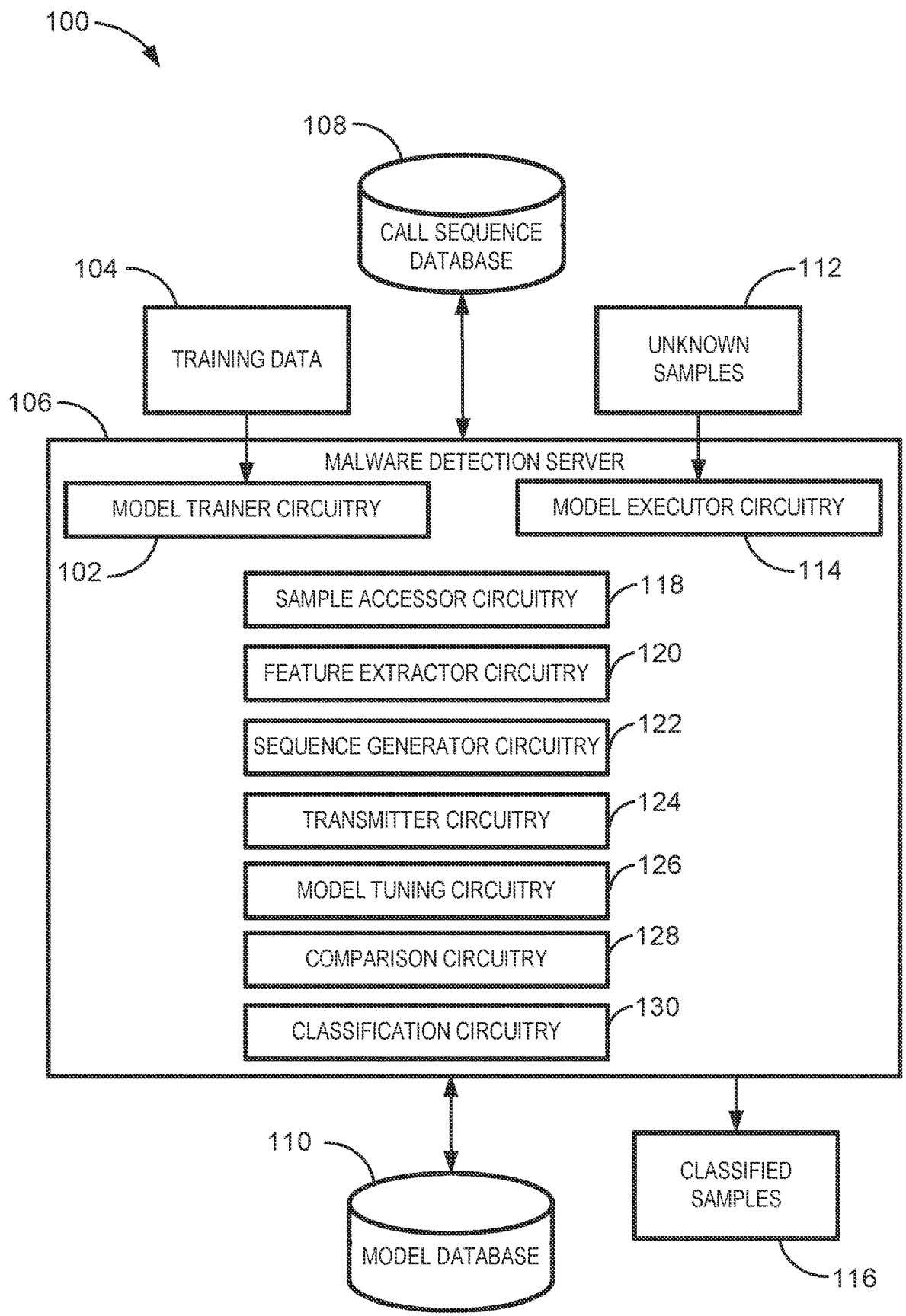
FIG. 1 is a block diagram of an example system to classify malware.

FIG. 1 is a block diagram of an example system 100 to classify malware. The example system 100 includes example model trainer circuitry 102, example training data 104, an example malware detection server 106, an example call sequence database 108, an example model database 110, example unknown samples 112, example model executor circuitry 114, and example classified samples 116. Further, the example malware detection server 106 includes example sample accessor circuitry 118, example feature extractor circuitry 120, example sequence generator circuitry 122, example transmitter circuitry 124, example model tuning circuitry 126, example comparison circuitry 128, and example classification circuitry 130. The example system 100 operatively communicates with an example classification model to classify the unknown samples 112. In this example, the unknown samples 112 can include unknown (e.g., unlabeled, unclassified, etc.) sets of instructions, unknown executable files, and/or unknown API call sequences. Alternatively, the example unknown samples 112 may be any other type of file (such as PEs) including a set of instructions.

Artificial Intelligence (AI), including ML, deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) results in output(s) consistent with the recognized patterns and/or associations.

The example model trainer circuitry 102 can train the classification model to operate in accordance with patterns and/or associations based on, for example, the training data 104. The classification model includes internal parameters that guide how input data is transformed into output data, such as through a series of nodes and connections within the model to transform input data into output data. Additionally, hyperparameters may be used as part of the training process to control how the learning is performed (e.g., a learning rate, a number of layers to be used in the machine learning model, etc.). Hyperparameters are defined to be training parameters that are determined prior to initiating the training process. Many different types of ML models and/or ML architectures exist. In examples described herein, the classification model may be implemented as a random forest (RF) model, support vector machines (SVMs), a gradient boosting (GB) classifier, NLP models, and/or neural networks (NNs) (e.g., convolutional NNs).

Different types of training may be performed based on the ML/AI architecture and/or the expected output of the classification model. For example, supervised training uses inputs and corresponding expected (e.g., labeled) outputs to select parameters (e.g., by iterating over combinations of select parameters) for the classification model that reduce model error. As used herein, the terms "labeled" and "classified" may be used interchangeably to refer to an expected output of the classification model. Alternatively, unsupervised training (e.g., used in DL) involved inferring patterns from inputs to select parameters for the classification model (e.g., without the benefit of expected outputs).

In general, the ML models, architectures, and/or types are implemented in a training algorithm. In FIG. 1, the example model trainer circuitry 102 is implemented on the same machine (e.g., the malware detection server 106) as the model executor circuitry 114. In some examples, the model trainer circuitry 102 may be implemented on a separate machine from the model executor circuitry 114. The separate machine may be hosted remotely at a central facility. The example model trainer circuitry 102 may implement the training algorithm using hyperparameters that control how the learning is performed (e.g., a learning rate, a number of layers to be used in the classification model, etc.). In some examples, retraining may be performed.

Because supervised training is used, the example training data 104 is labeled. Labeling may be applied to the example training data 104 manually. Additionally or alternatively, labeling may be applied using historical data from an example computer security company utilizing example values for sample classification described herein. In examples disclosed herein, the training data 104 is sub-divided into executable files (and the corresponding API call sequences) classified as clean and executable files (and the corresponding API call sequences) classified as malicious.

An example network can connect and facilitate communication between the model trainer circuitry 102, the call sequence database 108, the model database 110, the model executor circuitry 114, and the classification model. In some examples, the network is the Internet. However, the example network may be implemented using any suitable wired and/or wireless network(s) including, for example, one or more data buses, one or more local area networks (LANs), one or more wireless LAN (WLANs), one or more cellular networks, one or more coaxial cable networks, one or more satellite networks, one or more private networks, one or more public networks, etc. As used herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example model database 110 of FIG. 1 stores one or more versions of the example classification model. The example model database 110 is implemented by any memory, storage device and/or storage disc for storing data such as, for example, flash memory, magnetic media, optical media, solid state memory, hard drive(s), thumb drive(s), etc. Furthermore, the data stored in the model database 110 may be in any data format such as, for example, binary data, comma delimited data, tab delimited data, structured query language (SQL) structures, etc. While, in the illustrated example, the model database 110 is illustrated as a single device, the model database 110 and/or any other data storage devices described herein may be implemented by any number and/or type(s) of memories.

The example model executor circuitry 114 accesses the classification model from the model database 110 (e.g., via a network). The model executor circuitry 114 operates the classification model in an inference phase to process data. In the inference phase, the example unknown samples 112 are inputs to the classification model, and the classification model executes to output data. The output data of the malware detection server 106 are the classified samples 116, which are associated with the unknown samples 112 and describes whether ones of the unknown samples 112 are clean or malicious. This inference phase can be thought of as the AI "thinking" to generate the output based on what it learned from the training (e.g., by executing the classification model to apply the learned patterns and/or associations to the input data). In some examples, input data undergoes pre-processing before being used as an input to the classification model. Moreover, in some examples, the output data may undergo post-processing after it is generated by the classification model to mitigate malicious activities.

In some examples, output of the classification model may be captured and provided as feedback to the model trainer circuitry 102 (e.g., via a network). By analyzing the feedback, an accuracy of the example classification model can be determined. If the feedback indicates that the accuracy of the example classification model fails to satisfy a threshold or other criterion, training of an updated model can be triggered using the feedback and an updated training data set, hyper-parameters, etc., to generate an updated, deployed classification model. Nonetheless, the example system 100 produces the classification model that is used to classify the unknown samples 112 as clean or malicious. In turn, the sample classification(s) may then be used to mitigate malicious activity.

FIG. 1 includes a block diagram of an example implementation of the malware detection server 106 to train the classification model. The example malware detection server 106 includes example sample accessor circuitry 118, example feature extractor circuitry 120, example sequence generator circuitry 122, example transmitter circuitry 124, and example model tuning circuitry 126. The example malware detection server 106 of FIG. 1 may be instantiated (e.g., creating an instance of, bring into being for any length of time, materialize, implement, etc.) by programmable circuitry such as a Central Processor Unit (CPU) executing first instructions. Additionally or alternatively, the malware detection server 106 of FIG. 1 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions and/or FPGA circuitry performing operations to implement one or more virtual machines and/or containers.

The example sample accessor circuitry 118 accesses an example set of instructions representing executable instructions. During model training, the example sample accessor circuitry 118 accesses labeled (e.g., classified) set(s) of instructions (e.g., clean set(s) of instructions, malicious set(s) of instructions, etc.). For example, the sample accessor circuitry 118 accesses a labeled executable file including a labeled set of instructions. In some examples, the sample accessor circuitry 118 obtains a hash associated with the labeled set of instructions. As used herein, a "hash" is a signature or value that identifies data and/or the content of a file. For example, an executable file (or other set of instructions) may be represented by a hash including a string of numbers and letters that identifies the labeled executable file. In some examples, the labeled set of instructions obtained by the sample accessor circuitry 118 may initiate (or otherwise be associated with) an example API call sequence. As such, the example sample accessor circuitry 118 can access labeled API call sequences associated with the labeled sets of instructions. Further, in this example, the labeled set(s) of instructions obtained by the example sample accessor circuitry 118 defines the training data 104. In some examples, the sample accessor circuitry 118 stores the labeled set(s) of instructions, the labeled executable(s), the labeled API call sequence(s), the training data 104, etc., in the model database 110.

During model execution, the example sample accessor circuitry 118 accesses unlabeled (e.g., unclassified, unknown, etc.) set(s) of instructions. For example, the sample accessor circuitry 118 accesses the unknown samples 112 including unknown set(s) of instructions, unknown executable files, etc. Further, the example sample accessor circuitry 118 can access hashes associated with the unknown set(s) of instructions, unknown executable files, etc. In some examples, the sample accessor circuitry 118 is instantiated by programmable circuitry executing sample accessing instructions and/or configured to perform operations such as those represented by the flowcharts of FIGS. 4 and 5.

In some examples, the malware detection server 106 includes means for accessing labeled samples. For example, the means for accessing may be implemented by sample accessor circuitry 118. In some examples, the sample accessor circuitry 118 may be instantiated by programmable circuitry such as the example programmable circuitry 712 of FIG. 7. For instance, the sample accessor circuitry 118 may be instantiated by the example microprocessor 800 of FIG. 8 executing machine executable instructions such as those implemented by at least blocks 402, 404 of FIG. 4 and block 502 of FIG. 5. In some examples, sample accessor circuitry 118 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the sample accessor circuitry 118 may be instantiated by any other combination of hardware, software, and/or firmware. For example, the sample accessor circuitry 118 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example feature extractor circuitry 120 extracts features from the samples (e.g., during model training, during model execution, etc.). For example, during model training, the feature extractor circuitry 120 can extract features from the labeled set of instructions, the labeled executable file, and/or the labeled API call sequence associated with the labeled executable file. The example features extracted by the feature extractor circuitry 120 can include any characteristic of the labeled executable and/or the labeled API call sequence that may be used to classify a sample as clean or malicious. For example, the feature extractor circuitry 120 can extract fingerprints associated with the labeled executable. As used herein, a "fingerprint" is a hash that refers to a particular section of the executable file. In some examples, a fingerprint can identify malware. For example, if a malicious actor creates five variants of the same malware (e.g., five executable files labeled as malicious), then it is likely that even though the five samples will have different file hashes, the underlying sections of such samples may remain the same. If such sections are compared via the fingerprints, then the same signature (based on the fingerprint) can eventually detect all five samples.

In some examples, the feature extractor circuitry 120 can extract other features associated with the labeled executables and/or the labeled API call sequences such as dynamic opcode sequences and byte n-grams. Thus, the feature extractor circuitry 120 can extract example features (e.g., fingerprints, dynamic opcode sequences, byte n-grams, etc.) that indicate a label (clean or malicious) associated with the labeled executables.

During model execution, the example feature extractor circuitry 120 extracts features from the unlabeled samples. For example, the feature extractor circuitry 120 can extract features from the unlabeled set of instructions. The example features extracted by the feature extractor circuitry 120 can include any characteristic of the unlabeled executable that may be used to classify the unknown sample as clean or malicious. For example, the feature extractor circuitry 120 can extract fingerprints associated with the unlabeled executable. In other examples, the feature extractor circuitry 120 can extract other features associated with the unlabeled executables such as dynamic opcode sequences and byte n-grams. Thus, the feature extractor circuitry 120 can extract example features that can determine a label for the unlabeled sample. In some examples, the feature extractor circuitry 120 is instantiated by programmable circuitry executing factor extraction instructions and/or configured to perform operations such as those represented by the flowcharts of FIGS. 4 and 5.

In some examples, the malware detection server 106 includes means for extracting features. For example, the means for determining may be implemented by the feature extractor circuitry 120. In some examples, the feature extractor circuitry 120 may be instantiated by programmable circuitry such as the example programmable circuitry 712 of FIG. 7. For instance, the feature extractor circuitry 120 may be instantiated by the example microprocessor 800 of FIG. 8 executing machine executable instructions such as those implemented by at least blocks 406, 408 of FIG. 4 and blocks 512, 514 of FIG. 5. In some examples, the feature extractor circuitry 120 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the feature extractor circuitry 120 may be instantiated by any other combination of hardware, software, and/or firmware. For example, the feature extractor circuitry 120 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example comparison circuitry 128 compares the unknown sample to known samples stored in a database. For example, the comparison circuitry 128 compares the unlabeled executable file to labeled executable files stored in the call sequence database 108. In this example, the call sequence database 108 includes labeled executable files each having at least one labeled API call sequence. Accordingly, if the comparison circuitry 128 determines that the unlabeled executable file matches a labeled executable file, then the comparison circuitry 128 can determine that the unlabeled executable file and the labeled executable file share the labeled API call sequence. Put differently, matching executable files likely trigger/initiate the same API call sequence. As such, the example comparison circuitry 128 can associate unlabeled executable files with labeled API call sequences based on matching ones of labeled executable files stored in the call sequence database 108. In some examples, the comparison circuitry 128 can compare a hash of an unknown executable file to a hash of a known executable file. If the hash of the unknown executable file matches the hash of the known executable file, then the comparison circuitry 128 can associate the API call sequence of the known executable file with the unknown executable file because the files likely trigger the same API call sequence. In some examples, the comparison circuitry 128 is instantiated by programmable circuitry executing comparison instructions and/or configured to perform operations such as those represented by the flowchart of FIG. 5.

In some examples, the malware detection server 106 includes means for comparing. For example, the means for comparing may be implemented by comparison circuitry 128. In some examples, the comparison circuitry 128 may be instantiated by programmable circuitry such as the example programmable circuitry 712 of FIG. 7. For instance, the comparison circuitry 128 may be instantiated by the example microprocessor 800 of FIG. 8 executing machine executable instructions such as those implemented by at least blocks 504, 506 of FIG. 5. In some examples, the comparison circuitry 128 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the comparison circuitry 128 may be instantiated by any other combination of hardware, software, and/or firmware. For example, the comparison circuitry 128 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example sequence generator circuitry 122 determines an example API call sequence corresponding to an example set of instructions. For example, during model training, a labeled set of instructions (or a labeled executable file) may not yet have an associated API call sequence. In such examples, the sequence generator circuitry 122 can generate an API call sequence for the labeled set of instructions by executing the instructions in a sandbox environment and recording the API call sequence based on the execution of the labeled set of instructions. As such, the recorded API call sequence may share the same label as the executed set of instructions. For example, if the sequence generator circuitry 122 executes a set of instructions (accessed by the sample accessor circuitry 118) labeled "clean," then the resulting API call sequence may also include a "clean" label. Alternatively, if the sequence generator circuitry 122 executes a set of instructions labeled "malicious," then the resulting API call sequence may also include a "malicious" label. In some examples, the sequence generator circuitry 122 can execute such set(s) of instructions in a sandbox environment (e.g., Cuckoo sandbox) to record the resulting API call sequence(s). As used herein, a "sandbox environment" is a virtual machine that isolates an example executable file from a host (e.g., an OS) and records activities associated with the executable file such as file operations, network connections, registry changes, and API call sequences.

During model execution, the example sequence generator circuitry 122 determines an example API call sequence based on the unlabeled set of instructions. In some examples, when the comparison circuitry 128 determines that there may not be a matching known sample in the call sequence database 108, then the sequence generator circuitry 122 may determine an example API call sequence for the unknown sample. For example, the sequence generator circuitry 122 can generate an API call sequence for the unlabeled set of instructions by executing the instructions in a sandbox environment and recording the API call sequence based on the execution of the set of instructions. In other examples, the sequence generator circuitry 122 can determine an API call sequence associated with the unlabeled set of instructions based on the output of the comparison circuitry 128 (e.g., matching ones of executable files stored in the model database 110 likely share an API call sequence). As such, the sequence generator circuitry 122 can determine the unlabeled API call sequence associated with the unlabeled set of instructions. In some examples, the sequence generator circuitry 122 is instantiated by programmable circuitry executing sequence generator instructions and/or configured to perform operations such as those represented by the flowcharts of FIGS. 4 and 5.

In some examples, the malware detection server 106 includes means for generating a sequence. For example, the means for generating may be implemented by sequence generator circuitry 122. In some examples, the sequence generator circuitry 122 may be instantiated by programmable circuitry such as the example programmable circuitry 712 of FIG. 7. For instance, the sequence generator circuitry 122 may be instantiated by the example microprocessor 800 of FIG. 8 executing machine executable instructions such as those implemented by at least blocks 410, 412 of FIG. 4 and blocks 508, 510 of FIG. 5. In some examples, sequence generator circuitry 122 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the sequence generator circuitry 122 may be instantiated by any other combination of hardware, software, and/or firmware. For example, the sequence generator circuitry 122 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example transmitter circuitry 124 transmits the samples to the classification model. During model training, the example transmitter circuitry 124 transmits the labeled samples, the labeled API call sequences, the extracted features, etc., to the classification model. Further, the example transmitter circuitry 124 can transmit the labeled samples, the labeled API call sequences, the extracted features, etc., to the model database 110. Similarly, during model execution, the example transmitter circuitry 124 transmits the unlabeled set of instructions (e.g., the unlabeled sample), the unlabeled API call sequence, the extracted features, etc., to the classification model. For example, the transmitter circuitry 124 transmits the unlabeled set of instructions, the unlabeled API call sequence, the extracted features, etc., to the classification model for classification. Further, the transmitter circuitry 124 transmits the unlabeled set of instructions, the unlabeled API call sequence, the extracted features, etc., to the model database 110. In some examples, the transmitter circuitry 124 is instantiated by programmable circuitry executing transmission instructions and/or configured to perform operations such as those represented by the flowcharts of FIGS. 4 and 5.

In some examples, the malware detection server 106 includes means for transmitting. For example, the means for transmitting may be implemented by transmitter circuitry 124. In some examples, the transmitter circuitry 124 may be instantiated by programmable circuitry such as the example programmable circuitry 712 of FIG. 7. For instance, the transmitter circuitry 124 may be instantiated by the example microprocessor 800 of FIG. 8 executing machine executable instructions such as those implemented by at least blocks 413, 414 of FIG. 4 and block 516 of FIG. 5. In some examples, the transmitter circuitry 124 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the transmitter circuitry 124 may be instantiated by any other combination of hardware, software, and/or firmware. For example, the transmitter circuitry 124 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example model tuning circuitry 126 modifies the classification model. For example, the example model tuning circuitry 126 can update (e.g., refine, tune, etc.) parameters of the classification model based on the training process executed by the model trainer circuitry 102. In some examples, the model tuning circuitry 126 is instantiated by programmable circuitry executing tuning instructions and/or configured to perform operations such as those represented by the flowchart of FIG. 4.

In some examples, the malware detection server 106 includes means for adjusting. For example, the means for adjusting may be implemented by the model tuning circuitry 126. In some examples, the model tuning circuitry 126 may be instantiated by programmable circuitry such as the example programmable circuitry 712 of FIG. 7. For instance, the model tuning circuitry 126 may be instantiated by the example microprocessor 800 of FIG. 8 executing machine executable instructions such as those implemented by at least blocks 418 of FIG. 4. In some examples, the model tuning circuitry 126 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the model tuning circuitry 126 may be instantiated by any other combination of hardware, software, and/or firmware. For example, the model tuning circuitry 126 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example classification circuitry 130 determines a classification for the set of instructions based on the output of the classification model. In some examples, the classification circuitry 130 can determine a first probability that the set of instructions (and the associated API call sequence) is clean and a second probability that the set of instructions is malicious based on outputs of the classification model. Further, the classification circuitry 130 can classify the set of instructions as clean when the first probability is greater than the second probability. Alternatively, the classification circuitry 130 can classify the set of instructions as malicious when the second probability is greater than the first probability. In some examples, the classification circuitry 130 is instantiated by programmable circuitry executing classification instructions and/or configured to perform operations such as those represented by the flowchart of FIG. 5.

In some examples, the malware detection server 106 includes means for classifying an output. For example, the means for classifying may be implemented by classification circuitry 130. In some examples, the classification circuitry 130 may be instantiated by programmable circuitry such as the example programmable circuitry 712 of FIG. 7. For instance, the classification circuitry 130 may be instantiated by the example microprocessor 800 of FIG. 8 executing machine executable instructions such as those implemented by at least block 522 of FIG. 5. In some examples, the classification circuitry 130 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the classification circuitry 130 may be instantiated by any other combination of hardware, software, and/or firmware. For example, the classification circuitry 130 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example classification model is trained by the model trainer circuitry 102. During training, the transmitter circuitry 124 transmits the labeled sets of instructions, the labeled API call sequences, and the extracted factors to the classification model. In this example, the classification model is a NLP model that generates tokens to represent input data and classifies each of the tokens using a neural network (NN). For example, the classification model generates a set of example tokens representing a labeled API call sequence (e.g., a labeled API call sequence that was generated by the sequence generator circuitry 122). In some examples, the classification model parses the labeled API call sequence to generate the set of tokens. If the example classification model is implemented as a bidirectional encoder representations from transformers (BERT) model, then the classification model generates the set of tokens based on word embedding techniques such as word2vec. In other words, the classification model can generate the set of tokens by dividing the labeled API call sequence into sections and assigning a token to each section (e.g., based on word dependencies and/or patterns within the API call sequence). As such, the classification model can represent a labeled API call sequence as a set (e.g., group, pattern, list, etc.) of tokens.

The classification model processes the set of tokens in a NN to determine output classifications. For example, the classification model employs a NN to classify each of the tokens in the set as clean or malicious. As such, the classification model can determine that first ones of the tokens are clean and second ones of the tokens are malicious. Then, the classification model can store the first ones of the tokens (with the clean classification) and the second ones of the tokens (with the malicious classification) in the model database 110. As such, the model database 110 includes patterns associated with tokens that indicate a clean API call sequence and, thus, a clean executable file. Additionally, the model database 110 includes patterns associated with tokens that indicate a malicious API sequence and, thus, a malicious executable file. When the example classification model is eventually tasked with classifying an unknown sample, the classification model has learned patterns and associations pertaining to both clean and malicious tokens and can access this information via the model database 110.

Figure 2:
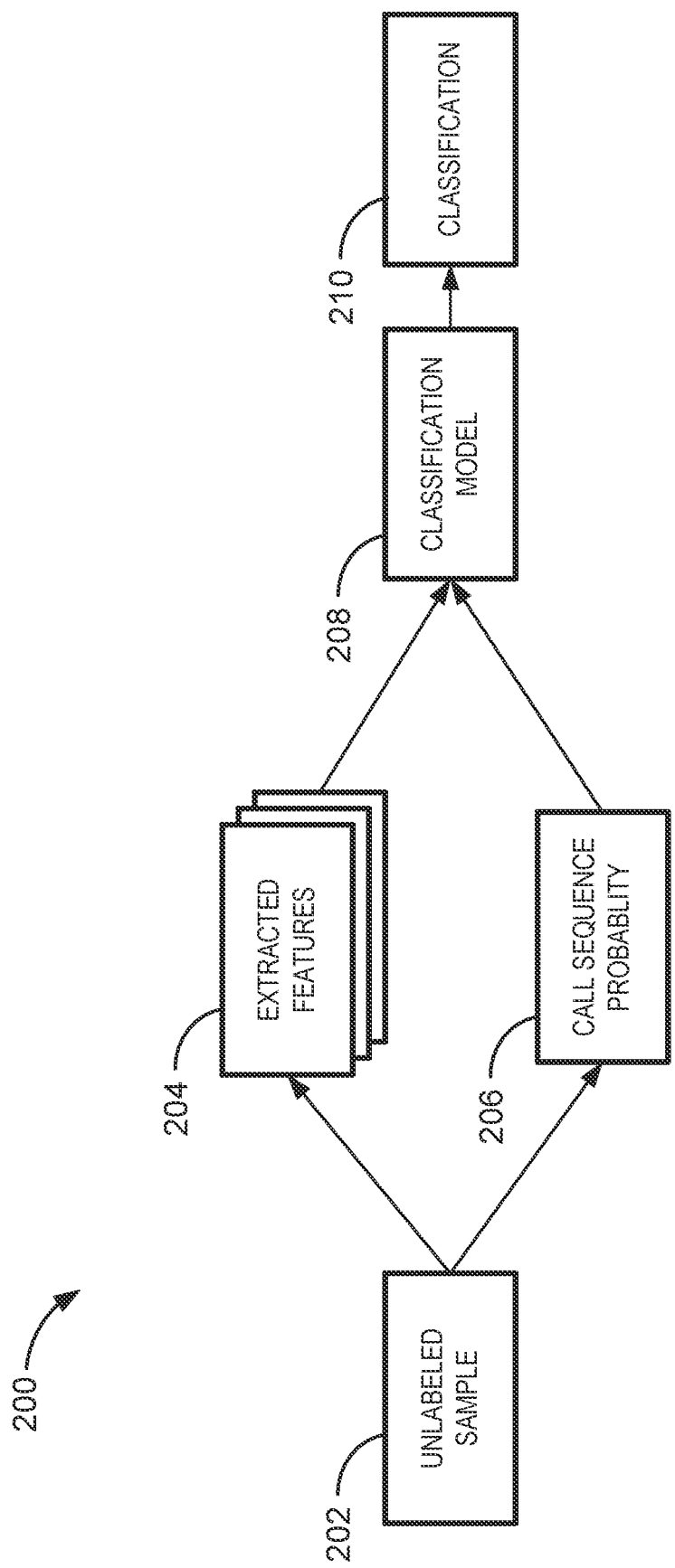
FIG. 2 illustrates an example sequence diagram demonstrating sample classification according to disclosed examples.

FIG. 2 illustrates an example sequence diagram 200 demonstrating sample classification according to disclosed examples. The example sequence diagram 200 begins as the sample accessor circuitry 118 accesses an example unlabeled sample (e.g., unlabeled executable file, unlabeled set of instructions, etc.) 202. In this example, the unlabeled sample 202 includes an unlabeled executable file and an unlabeled API call sequence associated with the unlabeled executable file. In some examples, the sequence generator circuitry 122 can generate the unlabeled API call sequence by executing the unlabeled executable file in a sandbox environment and recording the result. Then, the example feature extractor circuitry 120 extracts example features (e.g., fingerprints, dynamic opcode sequences, byte n-grams, etc.) 204 of the unlabeled sample 202.

Then, the example classification circuitry 130 determines a call sequence probability 206. In this example, the call sequence probability 206 indicates a likelihood that the unlabeled API call sequence is malicious. In some examples, the call sequence probability 206 is a value from 0 to 1. While in examples disclosed herein, probabilities are described on a scale from 0 to 1, any other scale for evaluating probabilities may additionally or alternatively be used. Further, the example classification circuitry 130 may define a threshold probability. For example, if the call sequence probability 206 exceeds the threshold probability (e.g., 0.8, 0.9, etc.), then the classification circuitry 130 may determine that the unlabeled API call sequence is malicious.

If the example extracted features 204 associated with the unlabeled API call sequence are similar to features of clean labeled API call sequences (e.g., in the call sequence database 108), then the call sequence probability 206 is likely low (e.g., 0.1), and can satisfy the threshold probability (e.g., 0.1<0.9). Alternatively, if the extracted features 204 associated with the unlabeled API call sequence are similar to features of malicious labeled API call sequences (e.g., in the call sequence database 108), then the call sequence probability 206 is likely high (e.g., 0.99) and can exceed the threshold probability (e.g., 0.99>0.9).

During model execution, the example transmitter circuitry 124 transmits the unlabeled sample 202, the extracted features 204, and the call sequence probability 206 to the classification model 208. The example classification model 208 is implemented as a NLP model and, thus, generates a set of example tokens representing the unlabeled API call sequence by dividing the unlabeled API call sequence into sections and assigning a token to each section. As such, the classification model 208 can represent an unlabeled API call sequence as a set of tokens (e.g., set of unclassified tokens).

Then, the classification model 208 employs a NN to classify each of the tokens in the set as clean or malicious. In particular, the classification model 208 refers to the patterns and associations stored in the model database 110 (from training) to determine whether each of the tokens is clean or malicious. For example, the classification model can determine that first ones of the tokens are clean based on similarities with other clean tokens in the model database 110. Alternatively, the classification model can determine that second ones of the tokens are malicious based on similarities with other malicious tokens in the model database 110.

The classification circuitry 130 can access these outputs (e.g., the clean tokens and the malicious tokens) associated with the unlabeled sample 202 and determine an example classification 210 (e.g., clean or malicious) of the unlabeled sample 202. For example, the classification circuitry 130 can determine a first probability that the unlabeled sample 202 is clean based on the clean tokens (e.g., a ratio of a number of clean tokens and a total number of tokens) associated with the unlabeled API call sequence. Further, the classification circuitry 130 can determine a second probability that the unlabeled sample 202 is malicious based on the malicious tokens (e.g., a ratio of a number of malicious tokens and a total number of tokens) associated with the unlabeled API call sequence. The classification circuitry 130 can classify the unlabeled API call sequence as clean when the first probability is greater than the second probability. If the classification circuitry 130 determines the unlabeled API call sequence is clean, then the classification circuitry 130 can also determine that the classification 210 of the unlabeled executable file and the unlabeled sample 202 is clean. Alternatively, the classification circuitry 130 can classify the unlabeled API call sequence as malicious when the second probability is greater than the first probability. If the classification circuitry 130 determines the unlabeled API call sequence is malicious, then the classification circuitry 130 can also determine that that the classification 210 of the unlabeled executable file and the unlabeled sample 202 is malicious.

FIG. 3 illustrates example output data 300 associated with the sequence diagram 200 of FIG. 2. The example output data 300 includes rows that correspond to example unlabeled samples. The example output data 300 can include example hashes 302 that represent each of the unlabeled samples. For example, the first row can correspond to the unlabeled sample 202. The example unlabeled sample 202 can include a hash "000012FB4674DFFCCF9-D5E46EE3B59DD" that represents the unlabeled executable file and/or the unlabeled API call sequence associated with the unlabeled executable file. The example classification circuitry 130 determines call sequence probabilities 304 for each of the unlabeled samples. For example, the classification circuitry 130 can determine the call sequence probability 206 (FIG. 2) associated with the unlabeled sample 202 is 0.010005.

In some examples, the output data 300 can include example percentages 306 that represent a portion of the extracted features (e.g., static (ST) features) of the unlabeled samples that indicate malicious activity and example percentages 308 that represent a portion of the extracted features of the unlabeled samples that indicate clean activity. For example, 31.06% of the extracted features 204 (FIG. 2) of the unlabeled sample 202 indicate malicious activity and 0.00% of the extracted features 204 of the unlabeled sample 202 indicate clean activity.

In some examples, the output data 300 can include example percentages 310 that represent a portion of the set of tokens that indicate clean activity. For example, the classification circuitry 130 can determine that 61.36% of the tokens in the set of tokens (e.g., the set of tokens that represent the unlabeled API call sequence) are clean. In some examples, the output data 300 can include example percentages 312 that represent a portion of the set of tokens that indicate malicious activity. For example, the classification circuitry 130 can determine that 0.25% of the tokens in the set of tokens are malicious.

In some examples, the output data 300 can include example unknown percentages 314 that represent a portion of the extracted features and/or a portion of the hash of the unlabeled samples that indicate unknown activity. For example, 7.32% of the data associated with the unlabeled sample 202 is unknown (e.g., unclassified) activity. Further, the example output data 300 can include a number of example fingerprints 316 associated with the unlabeled samples (e.g., the unlabeled sample 202 includes 4 fingerprints).

The example output data 300 can include example labels 318 corresponding to each of the unlabeled samples. In this example, an example label "0" indicates a clean sample and example label "1" indicates a malicious (e.g., dirty) sample. In some examples, the classification circuitry 130 can determine the labels 318 based on the hashes 302, the call sequence probabilities 304, the example percentages 306, 308, 310, 312, 314, the example fingerprints 316, the example counts 320, 322, etc. In this example, the unlabeled sample 202 is labeled "0." In other words, the example classification 210 of the sample 202 is clean.

Figure 4:
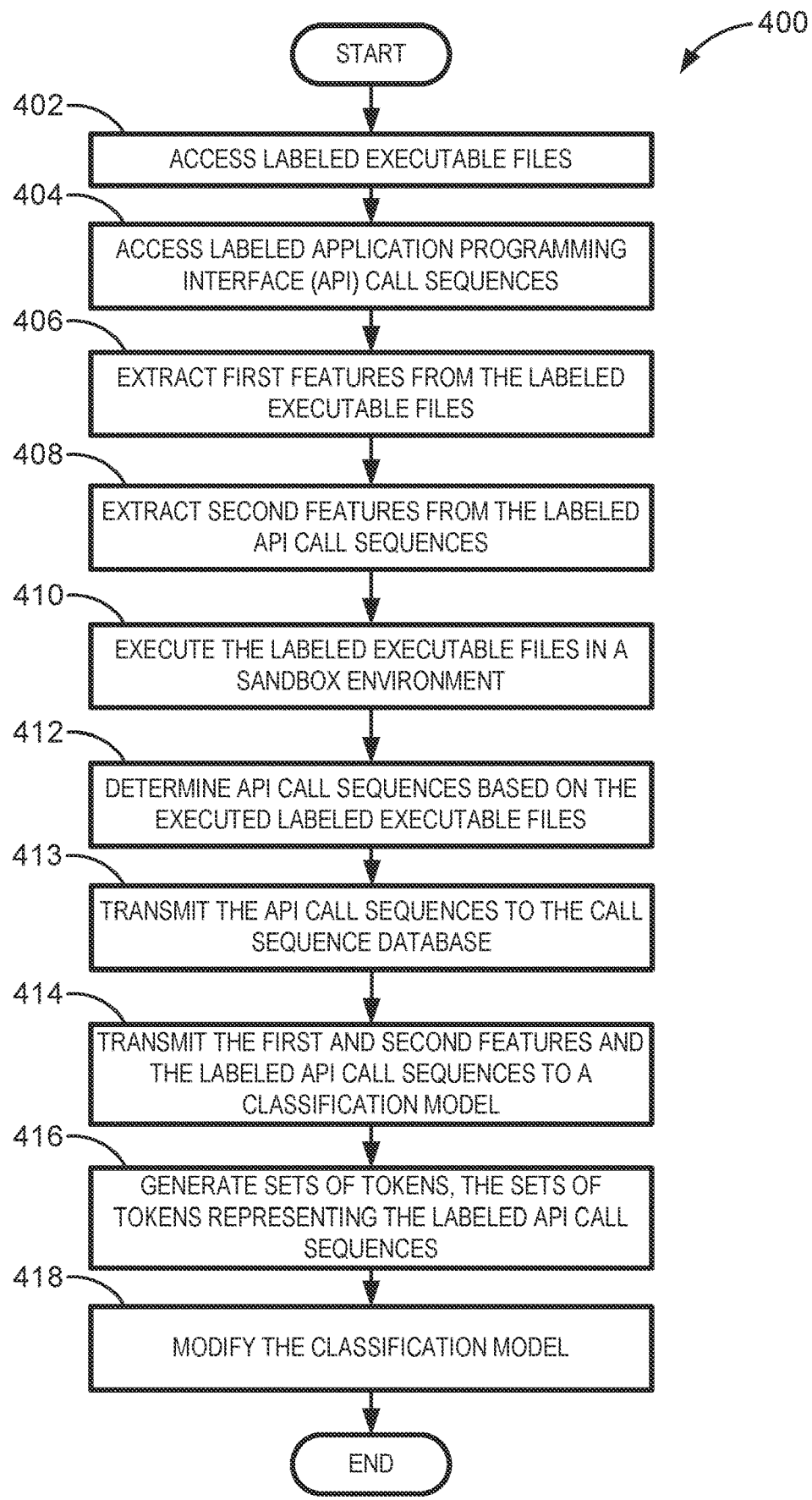
FIG. 4 is a flowchart representative of example machine readable instructions and/or example operations that may be executed, instantiated, and/or performed by example programmable circuitry to implement the malware detection server of FIG. 1 to train a classification model.
Figure 5:
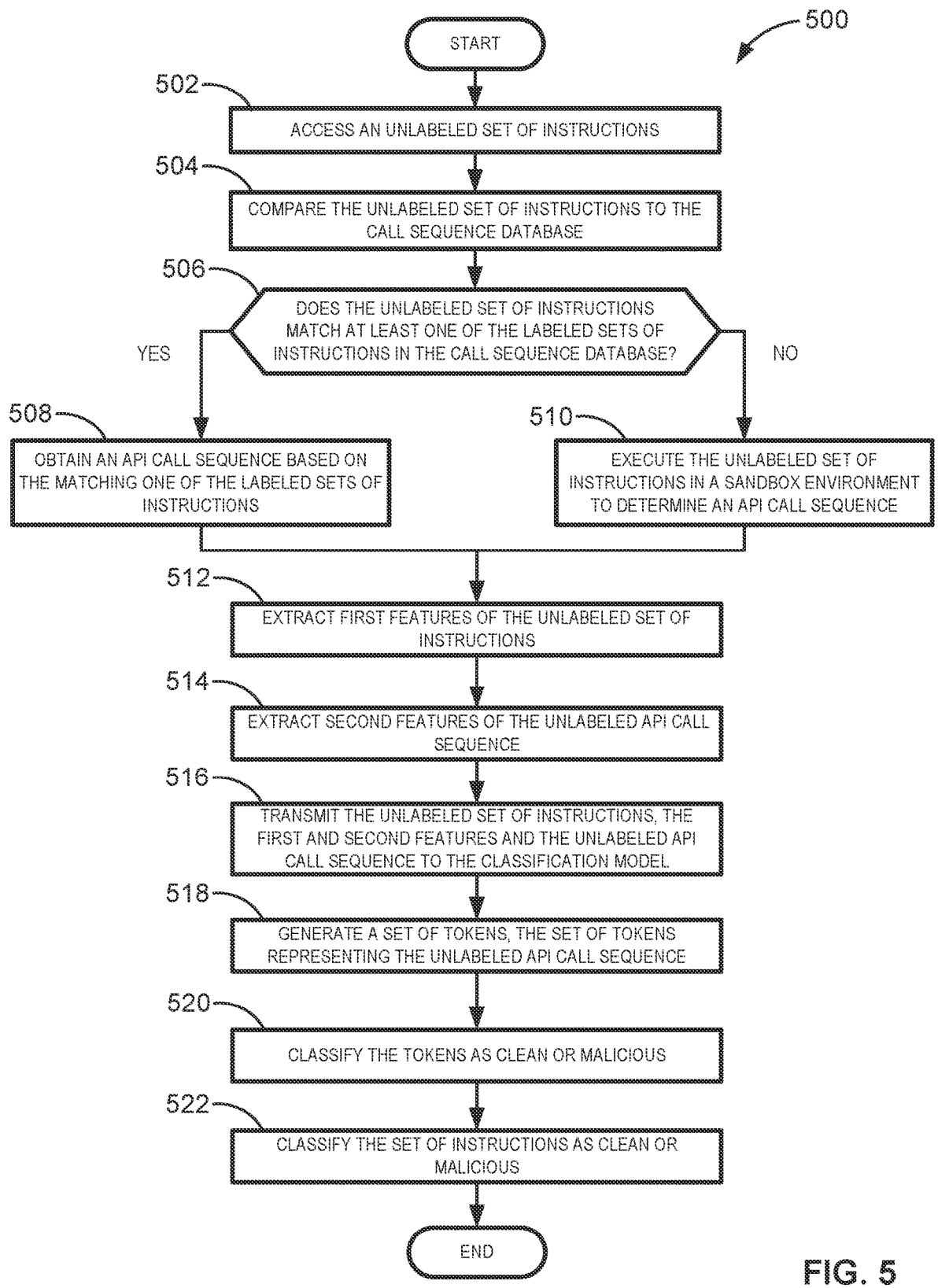
FIG. 5 is a flowchart representative of example machine readable instructions and/or example operations that may be executed, instantiated, and/or performed by example programmable circuitry to implement the malware detection server of FIG. 1 to perform malware detection.

While an example manner of implementing the malware detection server 106 is illustrated in FIG. 1, one or more of the elements, processes, and/or devices illustrated in FIG. 1 may be combined, divided, re-arranged, omitted, eliminated, and/or implemented in any other way. Further, the example sample accessor circuitry 118, the example feature extractor circuitry 120, the example sequence generator circuitry 122, the example transmitter circuitry 124, the example model tuning circuitry 126, the example comparison circuitry 128, the example classification circuitry 130, and/or, more generally, the example malware detection server 106 of FIG. 1 may be implemented by hardware alone or by hardware in combination with software and/or firmware. Thus, for example, any of the example sample accessor circuitry 118, the example feature extractor circuitry 120, the example sequence generator circuitry 122, the example transmitter circuitry 124, the example model tuning circuitry 126, the example comparison circuitry 128, the example classification circuitry 130, and/or, more generally, the example malware detection server 106, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example malware detection server 106 of FIG. 1 may include one or more elements, processes, and/or devices in addition to, or instead of, those illustrated in FIG. 1, and/or may include more than one of any or all of the illustrated elements, processes and devices.

Flowchart(s) representative of example machine readable instructions, which may be executed by programmable circuitry to implement and/or instantiate the example malware detection server 106 of FIG. 1 and/or representative of example operations which may be performed by programmable circuitry to implement and/or instantiate the example malware detection server 106 of FIG. 1, are shown in FIGS. 4 and 5. The machine readable instructions may be one or more executable programs or portion(s) of one or more executable programs for execution by programmable circuitry such as the programmable circuitry 712 shown in the example programmable circuitry platform 700 discussed below in connection with FIG. 7 and/or may be one or more function(s) or portion(s) of functions to be performed by the example programmable circuitry (e.g., an FPGA) discussed below in connection with FIGS. 8 and/or 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 4 and 5, many other methods of implementing the example malware detection server 106 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and 5 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 4 is a flowchart representative of example machine readable instructions and/or example operations 400 that may be executed, instantiated, and/or performed by programmable circuitry to train the classification model (e.g., the classification model 208). The example machine-readable instructions and/or the example operations 400 of FIG. 4 begin at block 402, at which the sample accessor circuitry 118 accesses labeled executable files. For example, the sample accessor circuitry 118 can access clean executable files including sets of instructions (also labeled clean). Alternatively, the example sample accessor circuitry 118 can access malicious executable files including sets of instructions (also labeled malicious). In some examples, the sample accessor circuitry 118 can access the labeled executable files from the training data 104.

At block 404, the example sample accessor circuitry 118 accesses labeled API call sequences. For example, the sample accessor circuitry 118 accesses labeled API call sequences from the training data 104.

At block 406, the example feature extractor circuitry 120 extracts first features from the labeled executable files. For example, the feature extractor circuitry 120 extracts first features such as fingerprints, dynamic opcode sequences, byte n-grams, etc., from the labeled executable files. In some examples, the first features can indicate clean aspects of clean executable files and/or malicious aspects of malicious executable files. Put differently, the example feature extractor circuitry 120 extracts first features from the labeled executable files that may indicate the corresponding label.

At block 408, the example feature extractor circuitry 120 extracts second features from the labeled API call sequences. For example, the feature extractor circuitry 120 extracts second features such as fingerprints, dynamic opcode sequences, byte n-grams, etc., from the labeled API call sequences. In some examples, the first features can indicate clean aspects of clean API call sequences and/or malicious aspects of malicious API call sequences. Put differently, the example feature extractor circuitry 120 extracts first features from the labeled API call sequences that may indicate the corresponding label.

At block 410, the example sequence generator circuitry 122 executes the labeled executable files in a sandbox environment. For example, the sequence generator circuitry 122 executes each of the labeled executable files in a sandbox environment and records the resulting operations.

At block 412, the example sequence generator circuitry 122 determines API call sequences based on the executed labeled executable files. For example, the sequence generator circuitry 122 determines API call sequences based on the recorded executions of each of the labeled executable files in the sandbox environment. If the example sequence generator circuitry 122 executes a clean executable file, then the resulting API call sequence may also include a "clean" label. Alternatively, if the example sequence generator circuitry 122 executes a malicious executable file, then the resulting API call sequence may also include a "malicious" label.

At block 413, the example transmitter circuitry 124 transmits the API call sequences to the call sequence database 108.

At block 414, the example transmitter circuitry 124 transmits the first and second features and the API call sequences to the classification model. For example, the transmitter circuitry 124 transmits the first features associated with the labeled executable files, the second features associated with the labeled API call sequences, and the labeled API call sequences to the classification model.

At block 416, the example classification model generates sets of tokens, the sets of tokens representing the labeled API call sequences. For example, the classification model generates a set of tokens for each of the labeled API call sequences via word embedding techniques such as word2vec. In other words, the classification model can generate the set of tokens by dividing an example labeled API call sequence into sections and assigning a token to each section (e.g., based on word dependencies and/or patterns within the API call sequence). As such, the classification model can represent a labeled API call sequence as a set of tokens.

At block 418, the example model tuning circuitry 126 modifies the classification model. For example, the model tuning circuitry 126 updates the classification model with the sets of tokens. In particular, the classification model can determine that first ones of the tokens are clean and second ones of the tokens are malicious. Then, the model tuning circuitry 126 can store the first ones of the tokens (with the clean classification) and the second ones of the tokens (with the malicious classification) in the model database 110. As such, the classification model can access patterns associated with tokens that indicate clean API call sequences and clean executable files. Additionally, the classification model can access patterns associated with tokens that indicate malicious API sequences and malicious executable files.

FIG. 5 is a flowchart representative of example machine readable instructions and/or example operations 500 that may be executed, instantiated, and/or performed by programmable circuitry to classify a sample. The example machine-readable instructions and/or the example operations 500 of FIG. 5 begin at block 502, at which the example sample accessor circuitry 118 accesses an unlabeled set of instructions. For example, the sample accessor circuitry 118 accesses a first one of the unknown samples 112. In this example, the first one of the unknown samples 112 is an unlabeled set of instructions. In other examples, the first one of the unknown samples 112 can be an unlabeled executable file (e.g., an unlabeled PE file).

At block 504, the example comparison circuitry 128 compares the unlabeled set of instructions to the model database 110. For example, the comparison circuitry 128 compares the unlabeled set of instructions to labeled executable files stored in the model database 110.

At block 506, the example comparison circuitry 128 determines whether the unlabeled set of instructions matches at least one of the labeled sets of instructions in the call sequence database 108. If the example comparison circuitry 128 determines the unlabeled set of instructions matches at least one of the labeled sets of instructions in the call sequence database 108, then control of the process proceeds to block 508. For example, if a first hash of the unlabeled set of instructions matches a second hash of a labeled set of instructions, then the comparison circuitry 128 determines that the unlabeled set of instructions matches the labeled set of instructions, and control proceeds to block 508. Alternatively, if the example comparison circuitry 128 determines the unlabeled set of instructions does not match at least one of the labeled sets of instruction in the call sequence database 108, then control proceeds to block 510. For example, if a first hash of the unlabeled set of instructions is different from the hashes of each of the labeled sets of instructions, then the comparison circuitry 128 determines that the unlabeled set of instructions does not match any of the labeled sets of instructions in the call sequence database 108 and control proceeds to block 510.

At block 508, the example sequence generator circuitry 122 obtains an API call sequence based on the matching one of the labeled sets of instructions. For example, the sequence generator circuitry 122 can determine an API call sequence associated with the unlabeled set of instructions based on the output of the comparison circuitry 128 (e.g., matching ones of executable files stored in the call sequence database 108 likely share an API call sequence). As such, the sequence generator circuitry 122 can determine the unlabeled API call sequence associated with the unlabeled set of instructions.

At block 510, the example sequence generator circuitry 122 executes the unlabeled set of instructions in a sandbox environment to determine an API call sequence. For example, the sequence generator circuitry 122 can generate an API call sequence for the unlabeled set of instructions by executing the instructions in a sandbox environment and recording the API call sequence based on the execution of the unlabeled set of instructions.

At block 512, the example feature extractor circuitry 120 extracts first features associated with the unlabeled set of instructions. For example, the feature extractor circuitry 120 extracts first features such as fingerprints, dynamic opcode sequences, byte n-grams, etc., from the unlabeled set of instructions.

At block 514, the example feature extractor circuitry 120 extracts second features from the unlabeled API call sequence. For example, the feature extractor circuitry 120 extracts second features such as fingerprints, dynamic opcode sequences, byte n-grams, etc., from the unlabeled API call sequence.

At block 516, the transmitter circuitry 124 transmits the unlabeled set of instructions, the first features, the second features, and the unlabeled API call sequence to the classification model. For example, the transmitter circuitry 124 transmits the unlabeled set of instructions, the unlabeled API call sequence, the extracted features, etc., to the classification model for classification.

At block 518, the example classification model generates a set of tokens, the set of tokens representing the unlabeled API call sequence. For example, the classification model generates a set of example tokens representing the unlabeled API call sequence by dividing the unlabeled API call sequence into sections and assigning a token to each section. As such, the classification model can represent an unlabeled API call sequence as a set of unclassified tokens.

At block 520, the example classification model classifies the tokens as clean or malicious. For example, the classification model employs a NN to classify each of the tokens in the set as clean or malicious. In particular, the classification model refers to the patterns and associations stored in the model database 110 (from training) to determine whether each of the tokens is clean or malicious. In some examples, the classification model determines that first ones of the classified tokens are clean based on similarities with other clean tokens in the model database 110. Alternatively, the classification model can determine that second ones of the classified tokens are malicious based on similarities with other malicious tokens in the model database 110.

At block 522, the example classification circuitry 130 classifies the unlabeled set of instructions as clean or malicious. For example, the classification circuitry 130 can determine a first probability that the set of instructions is clean based on the clean tokens (e.g., a ratio of a number of clean tokens and a total number of tokens). Further, the classification circuitry 130 can determine a second probability that the set of instructions is malicious based on the malicious tokens (e.g., a ratio of a number of malicious tokens and a total number of tokens). The classification circuitry 130 can classify the set of instructions as clean when the first probability is greater than the second probability. If the classification circuitry 130 determines the sample set of instructions is clean, then the classification circuitry 130 can also determine that the API call sequence corresponding to the sample set of instructions is clean (e.g., first ones of the classified samples 116). Alternatively, the classification circuitry 130 can classify the set of instructions as malicious when the second probability is greater than the first probability. If the classification circuitry 130 determines the sample set of instructions is malicious, then the classification circuitry 130 can also determine that the API call sequence corresponding to the sample set of instructions is malicious (e.g., second ones of the classified samples 116). Then, the process ends.

Figure 6A:
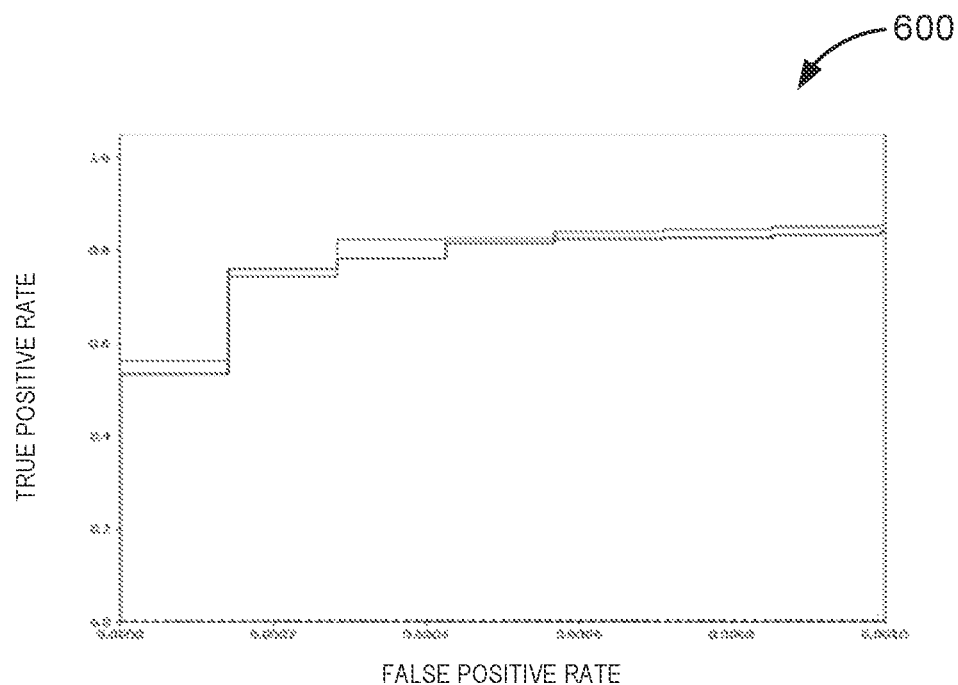
FIGS. 6A-6D include graphs with receiver operating characteristic (ROC) curves to describe the performance of the system of FIG. 1.
Figure 6B:
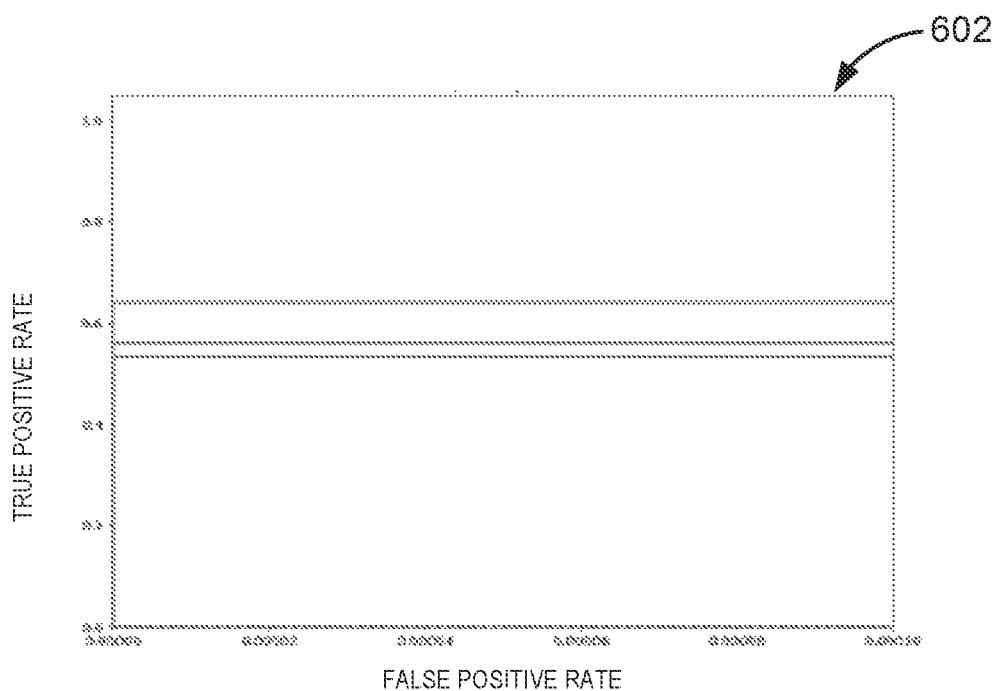

FIGS. 6A-6D include graphs 600, 602, 604, 606 with receiver operating characteristic (ROC) curves to describe performance of the example system 100 of FIG. 1. The example graph 600 corresponds to the performance of the system 100 when the malware detection server 106 classifies samples using static fingerprint analysis. The example graph 600 plots the false positive rate on the x axis and the true positive rate on the y axis. The graph 600 shows that the malware detection server 106 can correctly identify approximately (e.g., within 5%) 80% of true positive samples while falsely classifying clean samples as malicious less than 60% of the time. Furthermore, the true positive rate continually increases towards 100% as the false positive rate increases. The example graph 600 of FIG. 6A is shown at a first scale (e.g., $10^{-4}$). The example graph 602 of FIG. 6B represents the graph 600 with a second scale (e.g., $10^{-5}$).

Figure 6C:
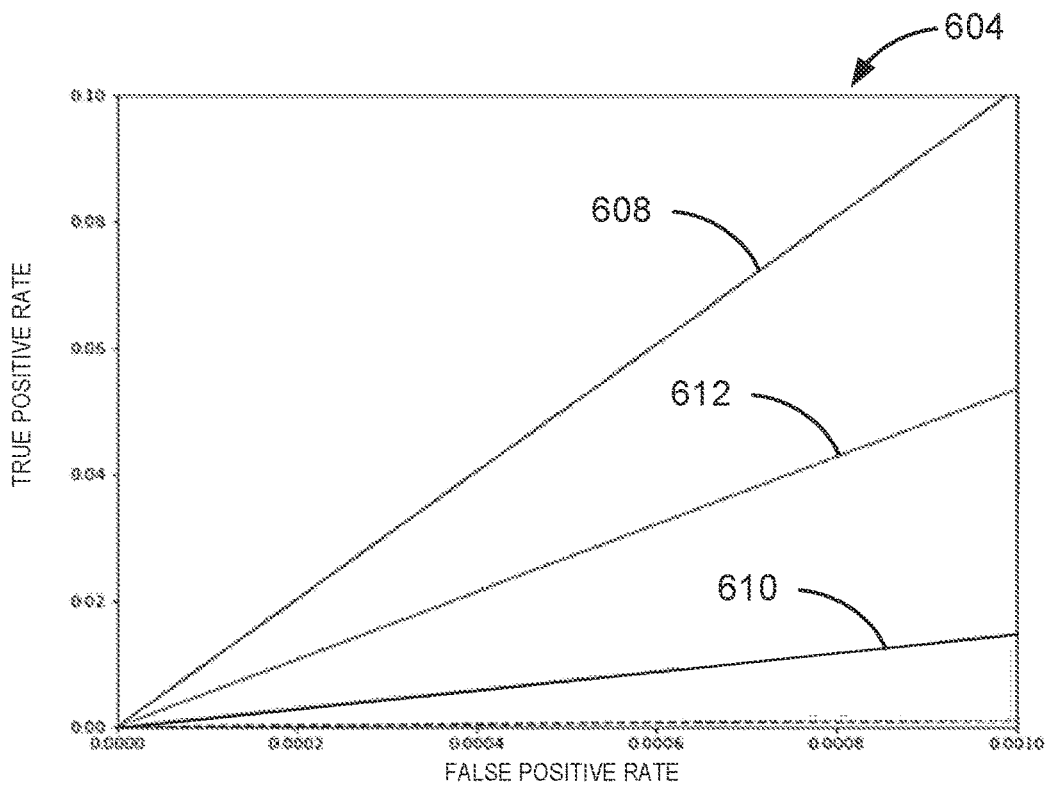
Figure 6D:
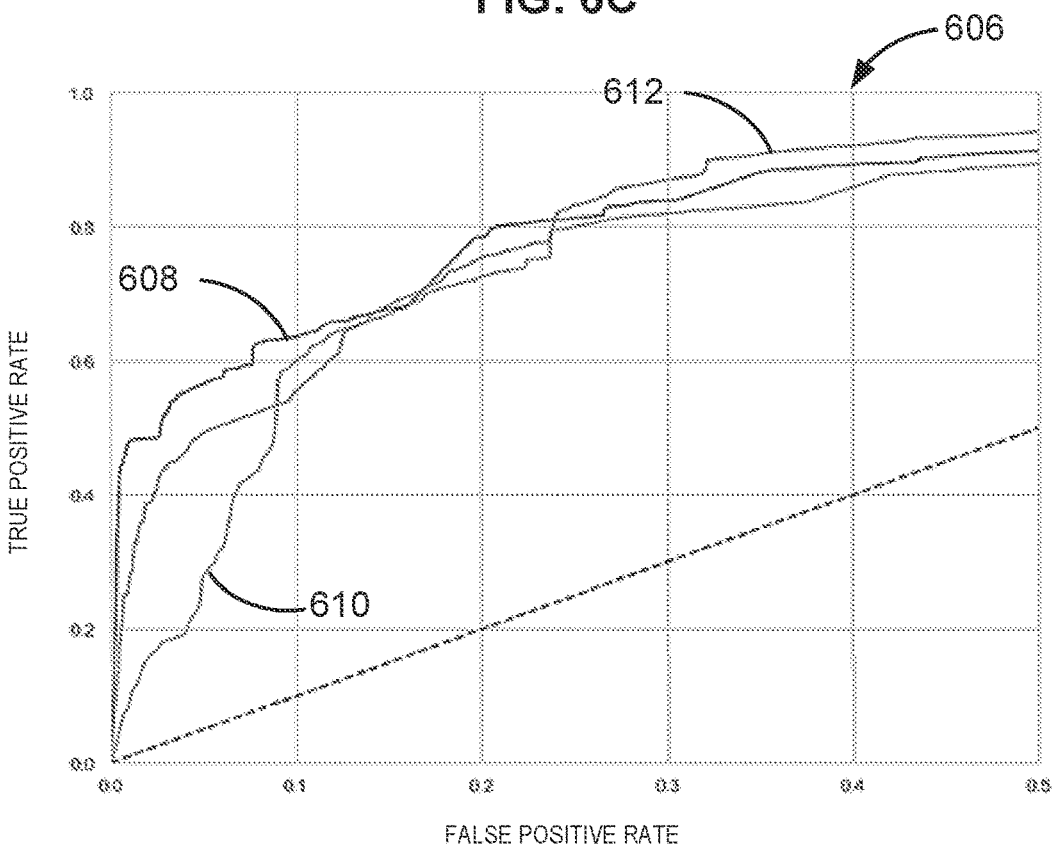

The example graph 604 corresponds to the performance of the system 100 when the malware detection server 106 classifies samples using NLP techniques and API call sequences. The example graph 604 plots the false positive rate on the x axis and the true positive rate on the y axis. The example graph 604 includes example plots 608, 610, 612. The example plot 608 represents the performance of the system 100 when the classification model is implemented as a BERT model. The example plot 610 represents the performance of the system 100 when the classification model is implemented as a long short-term memory (LSTM) model. The example plot 612 represents the performance of the system 100 when the classification model is implemented as a word2vec model. The example graph 604 of FIG. 6C is shown at a first scale (e.g., 104). The example graph 606 of FIG. 6D represents the graph 604 with a second scale (e.g., $10^{-1}$).

Figure 7:
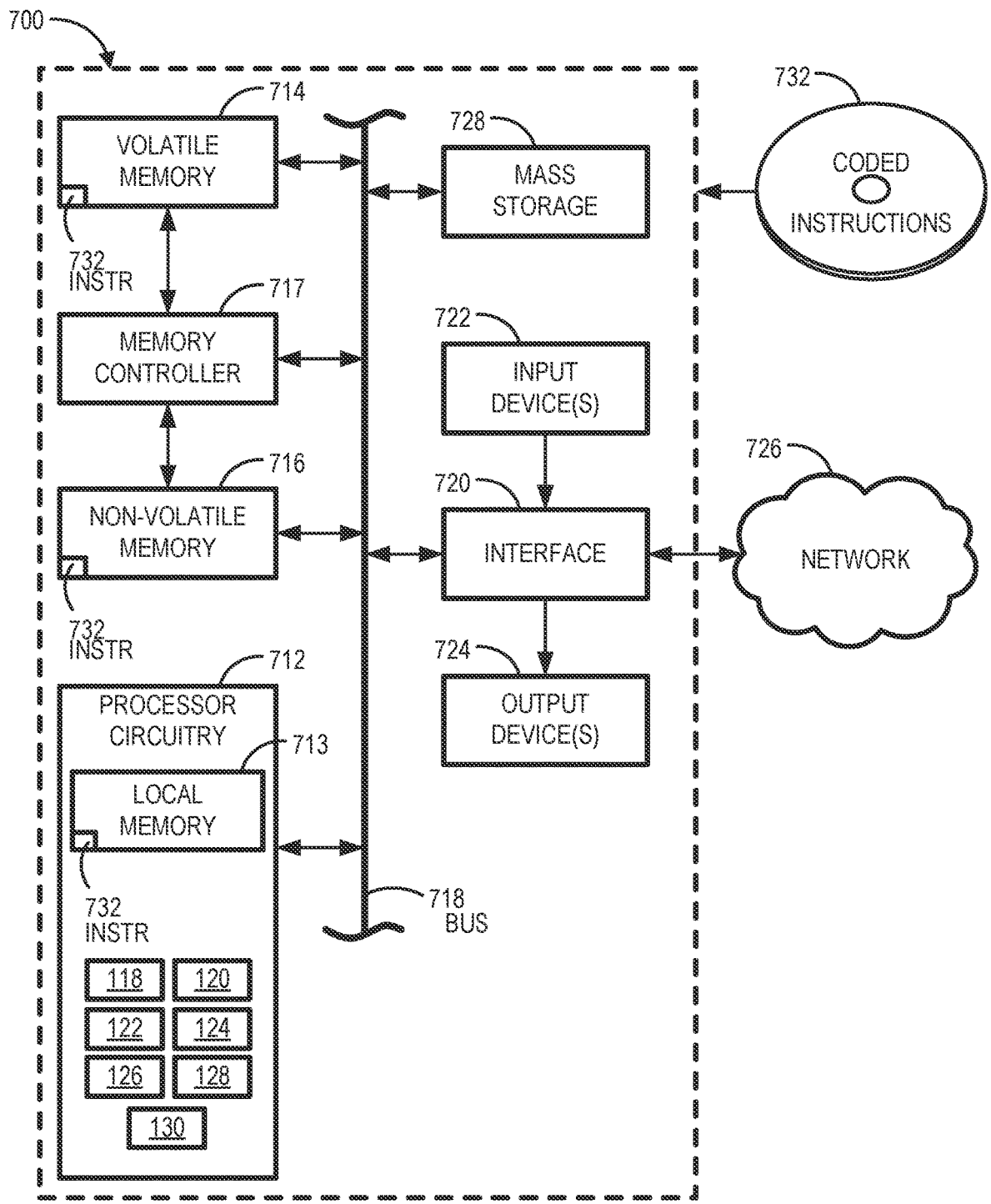
FIG. 7 is a block diagram of an example processing platform including programmable circuitry structured to execute, instantiate, and/or perform the example machine readable instructions and/or perform the example operations of FIGS. 4 and 5 to implement the example malware detection server 106 of FIG. 1.

FIG. 7 is a block diagram of an example programmable circuitry platform 700 structured to execute and/or instantiate the example machine-readable instructions and/or the example operations of FIGS. 4 and 5 to implement the example malware detection server 106 of FIG. 1. The programmable circuitry platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements the example sample accessor circuitry 118, the example feature extractor circuitry 120, the example sequence generator circuitry 122, the example transmitter circuitry 124, the example model tuning circuitry 126, the comparison circuitry 128, and the example classification circuitry 130.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIGS. 4 and 5, may be stored in the mass storage device 728, in the volatile memory 714, in the non-volatile memory 716, and/or on at least one non-transitory computer readable storage medium such as a CD or DVD which may be removable.

Figure 8:
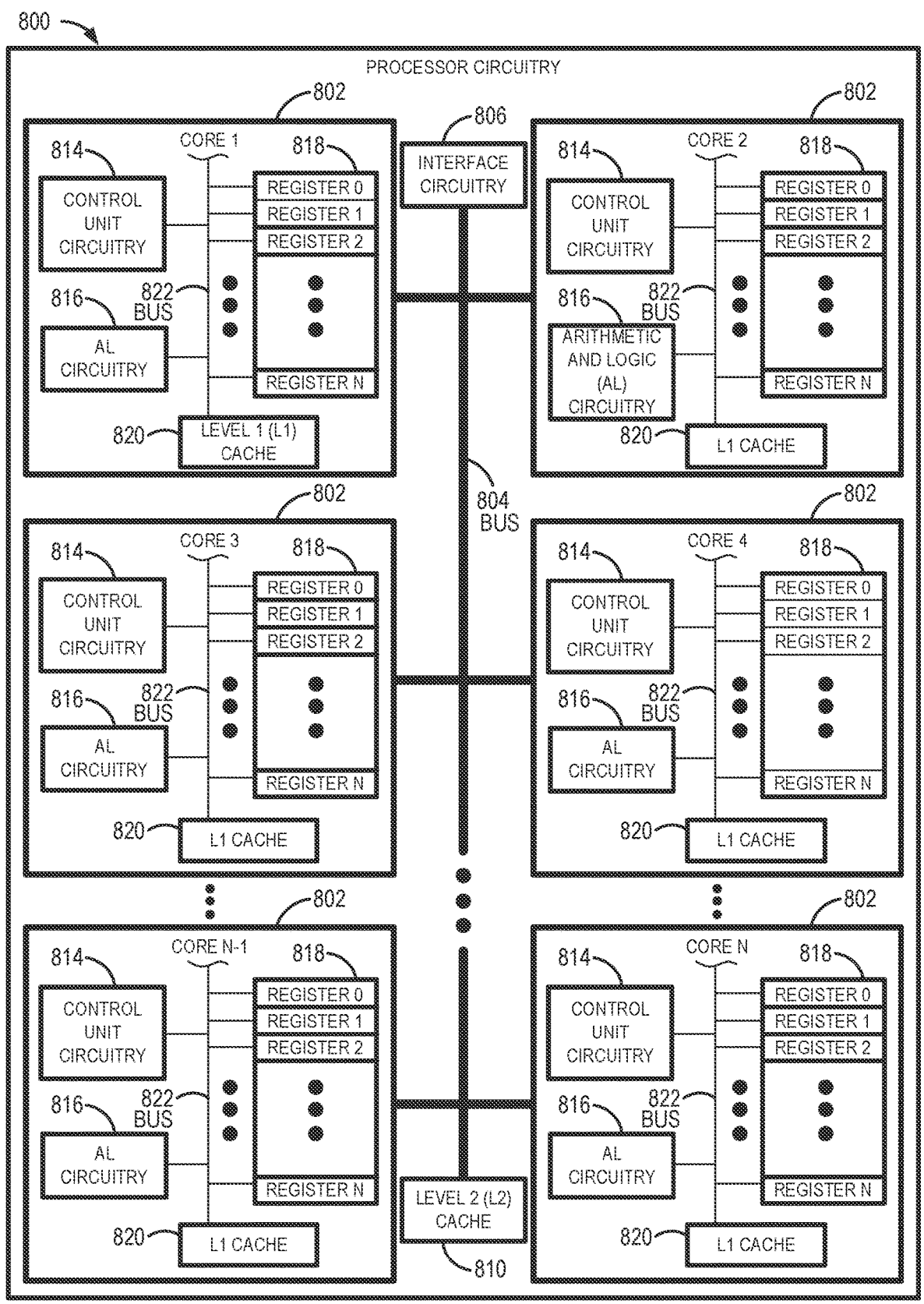
FIG. 8 is a block diagram of an example implementation of the programmable circuitry of FIG. 7.

FIG. 8 is a block diagram of an example implementation of the programmable circuitry 712 of FIG. 7. In this example, the programmable circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowcharts of FIGS. 4 and 5 to effectively instantiate the circuitry of FIG. 1 as logic circuits to perform operations corresponding to those machine readable instructions. In some such examples, the circuitry of FIG. 1 is instantiated by the hardware circuits of the microprocessor 800 in combination with the machine-readable instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4 and 5.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating-point operations. In yet other examples, the AL circuitry 816 may include first AL circuitry that performs integer-based operations and second AL circuitry that performs floating-point operations. In some examples, the AL circuitry 816 may be referred to as an Arithmetic Logic Unit (ALU).

The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine-specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure, such as by being distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages.

The microprocessor 800 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 800, in the same chip package as the microprocessor 800 and/or in one or more separate packages from the microprocessor 800.

Figure 9:
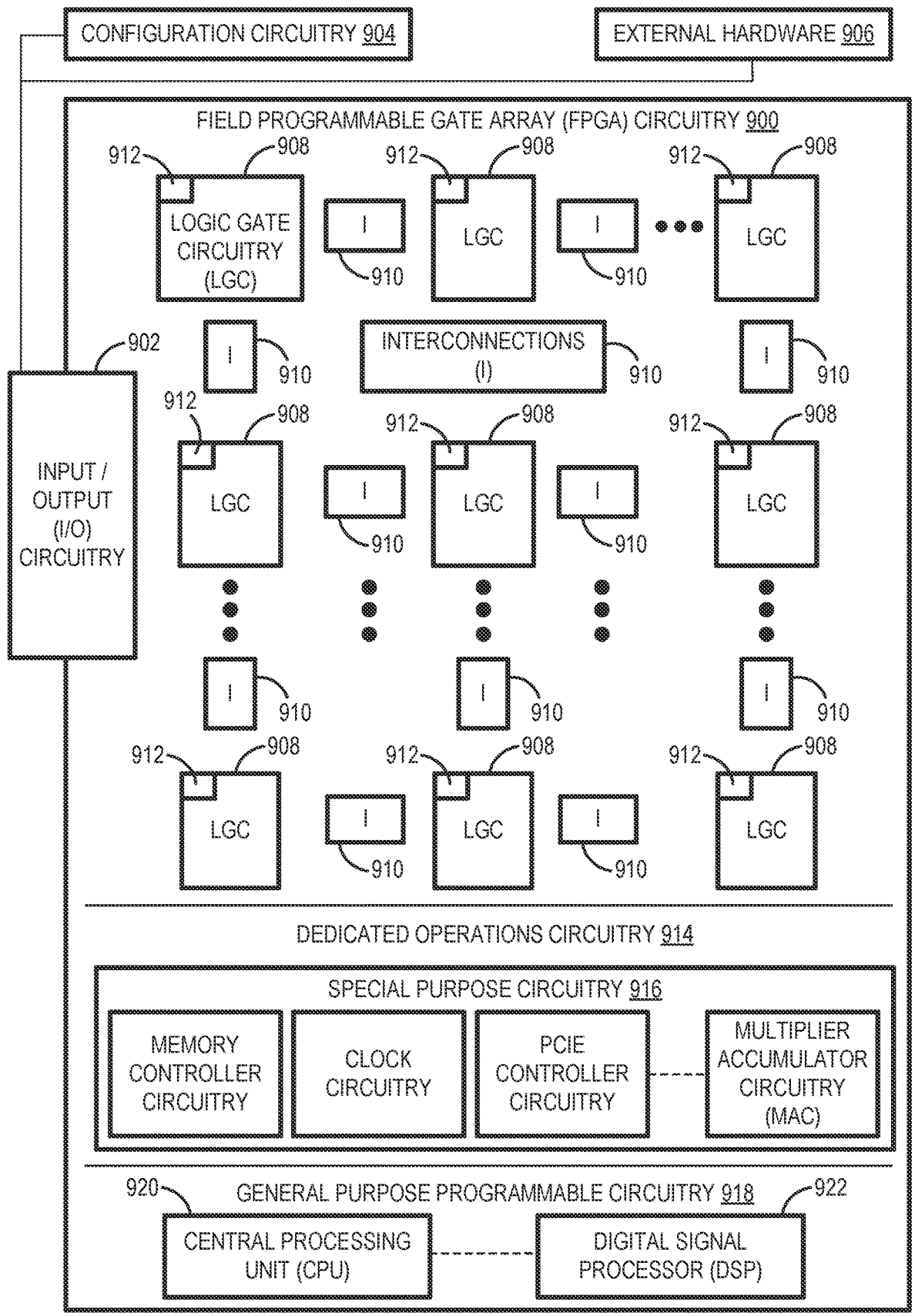
FIG. 9 is a block diagram of another example implementation of the programmable circuitry of FIG. 7.

FIG. 9 is a block diagram of another example implementation of the programmable circuitry 712 of FIG. 7. In this example, the programmable circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 800 of FIG. 8 described above (which is a general purpose device that may be programmed to execute some or all of the machine readable instructions represented by the flowchart(s) of FIGS. 4 and 5 but whose interconnections and logic circuitry are fixed once fabricated), the FPGA circuitry 900 of the example of FIG. 9 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 4 and 5. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 4 and 5. As such, the FPGA circuitry 900 may be configured and/or structured to effectively instantiate some or all of the operations/functions corresponding to the machine readable instructions of the flowchart(s) of FIGS. 4 and 5 as dedicated logic circuits to perform the operations/functions corresponding to those software instructions in a dedicated manner analogous to an ASIC. Therefore, the FPGA circuitry 900 may perform the operations/functions corresponding to the some or all of the machine readable instructions of FIGS. 4 and 5 faster than the general-purpose microprocessor can execute the same.

In the example of FIG. 9, the FPGA circuitry 900 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain a binary file, which may be implemented by a bit stream, data, and/or machine-readable instructions, to configure the FPGA circuitry 900, or portion(s) thereof. In some such examples, the configuration circuitry 904 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 906 may be implemented by external hardware circuitry. For example, the external hardware 906 may be implemented by the microprocessor 800 of FIG. 8.

The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations/functions that may correspond to at least some of the machine readable instructions of FIGS. 4 and 5 and/or other desired operations. The logic gate circuitry 908 shown in FIG. 9 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations/functions. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example dedicated operations circuitry 914. In this example, the dedicated operations circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry.

Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the programmable circuitry 712 of FIG. 7, many other approaches are contemplated. For example, FPGA circuitry may include an on-board CPU, such as one or more of the example CPU 920 of FIG. 8. Therefore, the programmable circuitry 712 of FIG. 7 may additionally be implemented by combining at least the example microprocessor 800 of FIG. 8 and the example FPGA circuitry 900 of FIG. 9. In some such hybrid examples, one or more cores 802 of FIG. 8 may execute a first portion of the machine readable instructions represented by the flowchart(s) of FIGS. 4 and 5 to perform first operation(s)/function(s), the FPGA circuitry 900 of FIG. 9 may be configured and/or structured to perform second operation(s)/function(s) corresponding to a second portion of the machine readable instructions represented by the flowcharts of FIGS. 4 and 5, and/or an ASIC may be configured and/or structured to perform third operation(s)/function(s) corresponding to a third portion of the machine readable instructions represented by the flowcharts of FIGS. 4 and 5.

It should be understood that some or all of the circuitry of FIG. 1 may, thus, be instantiated at the same or different times. For example, same and/or different portion(s) of the microprocessor 800 of FIG. 8 may be programmed to execute portion(s) of machine-readable instructions at the same and/or different times. In some examples, same and/or different portion(s) of the FPGA circuitry 900 of FIG. 9 may be configured and/or structured to perform operations/functions corresponding to portion(s) of machine-readable instructions at the same and/or different times.

In some examples, some or all of the circuitry of FIG. 1 may be instantiated, for example, in one or more threads executing concurrently and/or in series. For example, the microprocessor 800 of FIG. 8 may execute machine readable instructions in one or more threads executing concurrently and/or in series. In some examples, the FPGA circuitry 900 of FIG. 9 may be configured and/or structured to carry out operations/functions concurrently and/or in series. Moreover, in some examples, some or all of the circuitry of FIG. 1 may be implemented within one or more virtual machines and/or containers executing on the microprocessor 800 of FIG. 8.

In some examples, the programmable circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the programmable circuitry 712 of FIG. 7, which may be in one or more packages. For example, the XPU may include a CPU (e.g., the microprocessor 800 of FIG. 8, the CPU 920 of FIG. 9, etc.) in one package, a DSP (e.g., the DSP 922 of FIG. 9) in another package, a GPU in yet another package, and an FPGA (e.g., the FPGA circuitry 900 of FIG. 9) in still yet another package.

Figure 10:
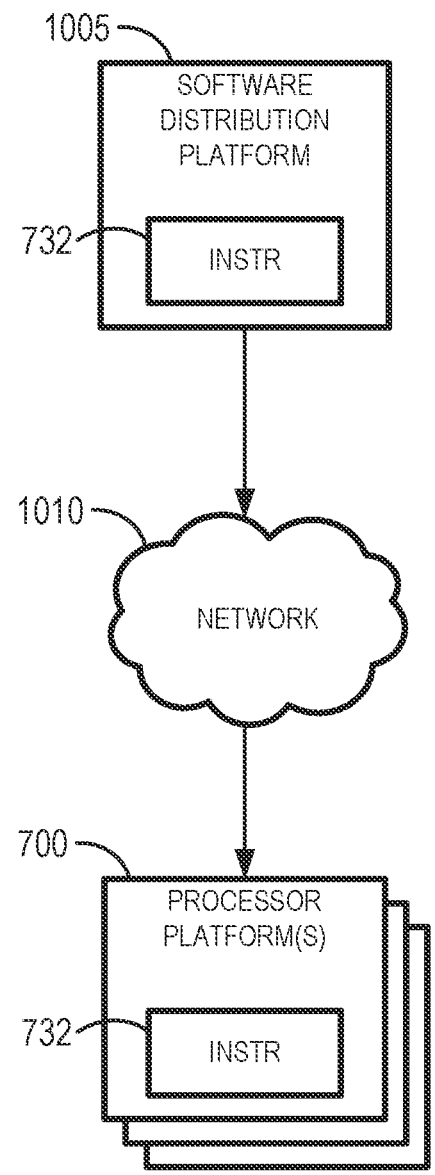
FIG. 10 is a block diagram of an example software/firmware/instructions distribution platform (e.g., one or more servers) to distribute software, instructions, and/or firmware (e.g., corresponding to the example machine readable instructions of FIGS. 4 and 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to other hardware devices (e.g., hardware devices owned and/or operated by third parties from the owner and/or operator of the software distribution platform) is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions of FIGS. 4 and 5, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions of FIGS. 4 and 5, may be downloaded to the example programmable circuitry platform 700, which is to execute the machine readable instructions 732 to implement the example malware detection server 106. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that analyze, scan, etc., an executable to determine whether the executable is trustworthy or contains malware. In particular, examples disclosed herein provide a safe framework to execute executable files and monitor the execution of the subsequent API call sequence. Additionally, examples disclosed herein may access ML models to provide probabilistic classification of samples. Further, examples disclosed herein utilize NLP models to symbolize and/or characterize executable files as sets of tokens which, in turn, can be employed as inputs to a ML model.

Disclosed systems, apparatus, articles of manufacture, and methods improve the efficiency of using a computing device by protecting endpoint devices from malware attacks. Disclosed systems, apparatus, articles of manufacture, and methods are accordingly directed to one or more improvement(s) in the operation of a machine such as a computer or other electronic and/or mechanical device. Further examples and combinations thereof include the following:

Example 1 includes an apparatus comprising interface circuitry, machine readable instructions, and programmable circuitry to at least one of instantiate or execute the machine readable instructions to access a set of instructions, the set of instructions representing executable instructions, determine an Application Programming Interface (API) call sequence based on the set of instructions, transmit the API call sequence to a natural language processing (NLP) model, the NLP model to generate a set of tokens, the set of tokens representing the API call sequence, the set of tokens readable in the NLP model, and classify the API call sequence as clean or malicious based on the tokens, and classify the set of instructions as clean or malicious based on the classification of the API call sequence and at least one other feature of the set of instructions.

Example 2 includes the apparatus of example 1, wherein the programmable circuitry is to parse the API call sequence to generate the set of tokens.

Example 3 includes the apparatus of example 1, wherein the set of instructions is an executable file, wherein the programmable circuitry is to generate the API call sequence by executing the executable file in a sandbox environment and recording the API call sequence based on the execution of the set of instructions.

Example 4 includes the apparatus of example 1, wherein first ones of the tokens are clean and second ones of the tokens are malicious.

Example 5 includes the apparatus of example 4, wherein the programmable circuitry is to determine a first probability that the API call sequence is clean based on the first ones of the tokens, determine a second probability that the API call sequence is malicious based on the second ones of the tokens, and classify the API call sequence as malicious when the second probability is greater than the first probability.

Example 6 includes the apparatus of example 1, wherein the programmable circuitry is to compare the set of instructions to known samples, the known samples stored in a database, the database including known API call sequences corresponding to the known samples, associate the set of instructions with a first one of the known samples when the set of instructions matches the first one of the known samples, and determine the API call sequence based on the match, the API call sequence associated with a first one of the known API call sequences, the first one of the known API call sequences corresponding to the first one of the known samples.

Example 7 includes the apparatus of example 6, wherein the programmable circuitry is to compare a hash of the set of instructions to a hash of the first one of the known samples, and associate the set of instructions with the first one of the known samples when the hash of the set of instructions matches the hash of the first one of the known samples.

Example 8 includes a non-transitory machine readable storage medium comprising instructions to cause programmable circuitry to at least access a set of instructions, the set of instructions representing executable instructions, determine an Application Programming Interface (API) call sequence based on the set of instructions, transmit the API call sequence to a natural language processing (NLP) model, the NLP model to generate a set of tokens, the set of tokens representing the API call sequence, the set of tokens readable in the NLP model, and classify the API call sequence as clean or malicious based on the tokens, and classify the set of instructions as clean or malicious based on the classification of the API call sequence and at least one other feature of the set of instructions.

Example 9 includes the non-transitory machine readable storage medium of example 8, wherein the instructions cause the programmable circuitry to parse the API call sequence to generate the set of tokens.

Example 10 includes the non-transitory machine readable storage medium of example 8, wherein the set of instructions is an executable file, wherein the instructions cause the programmable circuitry to generate the API call sequence by executing the executable file in a sandbox environment and recording the API call sequence based on the execution of the set of instructions.

Example 11 includes the non-transitory machine readable storage medium of example 8, wherein first ones of the tokens are clean and second ones of the tokens are malicious.

Example 12 includes the non-transitory machine readable storage medium of example 11, wherein the instructions cause the programmable circuitry to determine a first probability that the API call sequence is clean based on the first ones of the tokens, determine a second probability that the API call sequence is malicious based on the second ones of the tokens, and classify the API call sequence as malicious when the second probability is greater than the first probability.

Example 13 includes the non-transitory machine readable storage medium of example 8, wherein the instructions cause the programmable circuitry to compare the set of instructions to known samples, the known samples stored in a database, the database including known API call sequences corresponding to the known samples, associate the set of instructions with a first one of the known samples when the set of instructions matches the first one of the known samples, and determine the API call sequence based on the match, the API call sequence associated with a first one of the known API call sequences, the first one of the known API call sequences corresponding to the first one of the known samples.

Example 14 includes the non-transitory machine readable storage medium of example 13, wherein the instructions cause the programmable circuitry to compare a hash of the set of instructions to a hash of the first one of the known samples, and associate the set of instructions with the first one of the known samples when the hash of the set of instructions matches the hash of the first one of the known samples.

Example 15 includes a method comprising accessing, with programmable circuitry, a set of instructions, the set of instructions representing executable instructions, determining, with the programmable circuitry, an Application Programming Interface (API) call sequence based on the set of instructions, transmitting, with the programmable circuitry, the API call sequence to a natural language processing (NLP) model, the NLP model to generate a set of tokens, the set of tokens representing the API call sequence, the set of tokens readable in the NLP model, and classify the API call sequence as clean or malicious based on the tokens, and classifying, with the programmable circuitry, the set of instructions as clean or malicious based on the classification of the API call sequence and at least one other feature of the set of instructions.

Example 16 includes the method of example 15, further including parsing the API call sequence to generate the set of tokens.

Example 17 includes the method of example 15, wherein the set of instructions is an executable file, further including generating the API call sequence by executing the executable file in a sandbox environment, and recording the API call sequence based on the execution of the set of instructions.

Example 18 includes the method of example 15, wherein first ones of the tokens are clean and second ones of the tokens are malicious.

Example 19 includes the method of example 18, further including determining a first probability that the API call sequence is clean based on the first ones of the tokens, determining a second probability that the API call sequence is malicious based on the second ones of the tokens, and classifying the API call sequence as malicious when the second probability is greater than the first probability.

Example 20 includes the method of example 15, further including comparing the set of instructions to known samples, the known samples stored in a database, the database including known API call sequences corresponding to the known samples, associating the set of instructions with a first one of the known samples when the set of instructions matches the first one of the known samples, and determining the API call sequence based on the match, the API call sequence associated with a first one of the known API call sequences, the first one of the known API call sequences corresponding to the first one of the known samples.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   interface circuitry;
   machine readable instructions; and
   programmable circuitry to at least one of instantiate or execute the machine readable instructions to:
   access a set of instructions, the set of instructions representing executable instructions;
   determine an Application Programming Interface (API) call sequence based on the set of instructions;
   transmit the API call sequence to model executor circuitry for execution of a natural language processing (NLP) model, the execution of the NLP model to cause the model executor circuitry to:
   generate a set of tokens, the set of tokens representing the API call sequence, the set of tokens readable in the NLP model; and
   classify the API call sequence as clean or malicious based on the tokens; and
   classify the set of instructions as clean or malicious based on the classification of the API call sequence and at least one other feature of the set of instructions.

2. The apparatus of claim 1, wherein the programmable circuitry is to cause the model executor circuitry to parse the API call sequence to generate the set of tokens.

3. The apparatus of claim 1, wherein the set of instructions is an executable file, wherein the programmable circuitry is to generate the API call sequence by executing the executable file in a sandbox environment and recording the API call sequence based on the execution of the set of instructions.

4. The apparatus of claim 1, wherein first ones of the tokens are clean and second ones of the tokens are malicious.

5. The apparatus of claim 4, wherein the programmable circuitry is to:
   determine a first probability that the API call sequence is clean based on the first ones of the tokens;
   determine a second probability that the API call sequence is malicious based on the second ones of the tokens; and
   classify the API call sequence as malicious when the second probability is greater than the first probability.

6. The apparatus of claim 1, wherein the programmable circuitry is to:
   compare the set of instructions to known samples, the known samples stored in a database, the database including known API call sequences corresponding to the known samples;
   associate the set of instructions with a first one of the known samples when the set of instructions matches the first one of the known samples; and
   determine the API call sequence based on the match, the API call sequence associated with a first one of the known API call sequences, the first one of the known API call sequences corresponding to the first one of the known samples.

7. The apparatus of claim 6, wherein the programmable circuitry is to:
   compare a hash of the set of instructions to a hash of the first one of the known samples; and
   associate the set of instructions with the first one of the known samples when the hash of the set of instructions matches the hash of the first one of the known samples.

8. The apparatus of claim 1, wherein the programmable circuitry includes the model executor circuitry.

9. A non-transitory machine readable storage medium comprising instructions to cause programmable circuitry to at least:
   access a set of instructions, the set of instructions representing executable instructions;
   determine an Application Programming Interface (API) call sequence based on the set of instructions;
   transmit the API call sequence to model executor circuitry for execution of a natural language processing (NLP) model, the execution of the NLP model to cause the model executor circuitry to:
   generate a set of tokens, the set of tokens representing the API call sequence, the set of tokens readable in the NLP model; and
   classify the API call sequence as clean or malicious based on the tokens; and
   classify the set of instructions as clean or malicious based on the classification of the API call sequence and at least one other feature of the set of instructions.

10. The non-transitory machine readable storage medium of claim 9, wherein the instructions cause the programmable circuitry to cause the model executor circuitry to parse the API call sequence to generate the set of tokens.

11. The non-transitory machine readable storage medium of claim 9, wherein the set of instructions is an executable file, wherein the instructions cause the programmable circuitry to generate the API call sequence by executing the executable file in a sandbox environment and recording the API call sequence based on the execution of the set of instructions.

12. The non-transitory machine readable storage medium of claim 9, wherein first ones of the tokens are clean and second ones of the tokens are malicious.

13. The non-transitory machine readable storage medium of claim 12, wherein the instructions cause the programmable circuitry to:
   determine a first probability that the API call sequence is clean based on the first ones of the tokens;

determine a second probability that the API call sequence is malicious based on the second ones of the tokens; and classify the API call sequence as malicious when the second probability is greater than the first probability.

14. The non-transitory machine readable storage medium of claim 9, wherein the instructions cause the programmable circuitry to:

compare the set of instructions to known samples, the known samples stored in a database, the database including known API call sequences corresponding to the known samples;

associate the set of instructions with a first one of the known samples when the set of instructions matches the first one of the known samples; and determine the API call sequence based on the match, the API call sequence associated with a first one of the known API call sequences, the first one of the known API call sequences corresponding to the first one of the known samples.

15. The non-transitory machine readable storage medium of claim 14, wherein the instructions cause the programmable circuitry to:

compare a hash of the set of instructions to a hash of the first one of the known samples; and associate the set of instructions with the first one of the known samples when the hash of the set of instructions matches the hash of the first one of the known samples.

16. The non-transitory machine readable storage medium of claim 9, wherein the programmable circuitry includes the model executor circuitry.

17. A method comprising:

accessing, with programmable circuitry, a set of instructions, the set of instructions representing executable instructions;

determining, with the programmable circuitry, an Application Programming Interface (API) call sequence based on the set of instructions;

transmitting, with the programmable circuitry, the API call sequence to a natural language processing (NLP) model, the NLP model to:

generate a set of tokens, the set of tokens representing the API call sequence, the set of tokens readable in the NLP model; and classify the API call sequence as clean or malicious based on the tokens; and classifying, with the programmable circuitry, the set of instructions as clean or malicious based on the classification of the API call sequence and at least one other feature of the set of instructions.

18. The method of claim 17, further including parsing the API call sequence to generate the set of tokens.

19. The method of claim 17, wherein the set of instructions is an executable file, further including:

generating the API call sequence by executing the executable file in a sandbox environment; and recording the API call sequence based on the execution of the set of instructions.

20. The method of claim 17, wherein first ones of the tokens are clean and second ones of the tokens are malicious.

21. The method of claim 20, further including:

determining a first probability that the API call sequence is clean based on the first ones of the tokens;

determining a second probability that the API call sequence is malicious based on the second ones of the tokens; and classifying the API call sequence as malicious when the second probability is greater than the first probability.

22. The method of claim 17, further including:

comparing the set of instructions to known samples, the known samples stored in a database, the database including known API call sequences corresponding to the known samples;

associating the set of instructions with a first one of the known samples when the set of instructions matches the first one of the known samples; and determining the API call sequence based on the match, the API call sequence associated with a first one of the known API call sequences, the first one of the known API call sequences corresponding to the first one of the known samples.

* * * * *